Jan. 6, 1970     L. JULIE     3,488,760
REED RELAY MODULE

Filed April 10, 1968     2 Sheets-Sheet 1

INVENTOR.
LOEBE JULIE
BY
Eliot S. Gerber
ATTORNEY

Jan. 6, 1970  L. JULIE  3,488,760
REED RELAY MODULE
Filed April 10, 1968  2 Sheets-Sheet 2
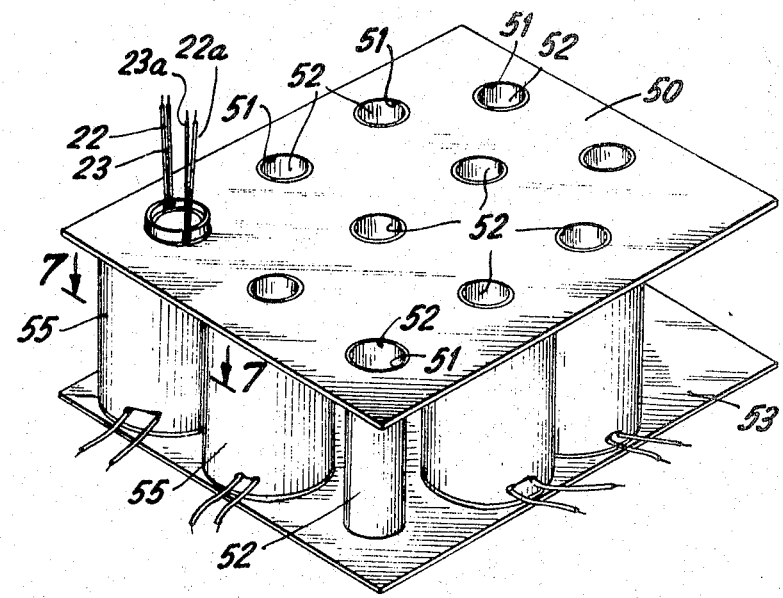
FIG. 5
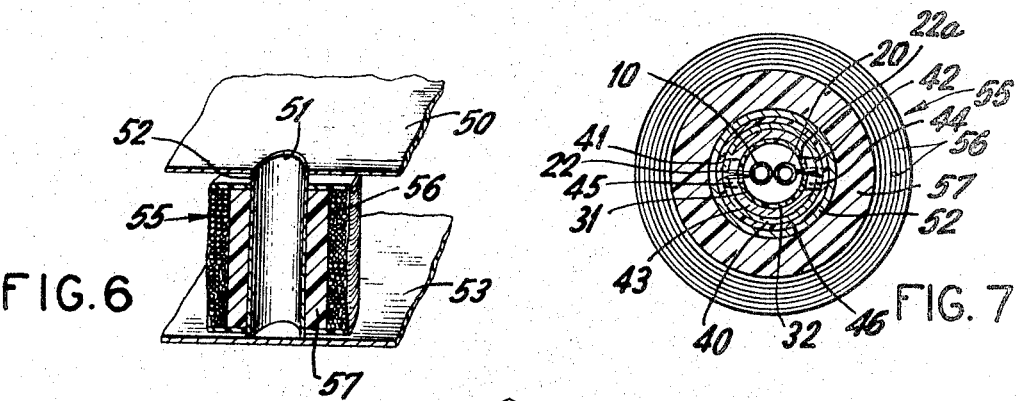
FIG. 6
FIG. 7
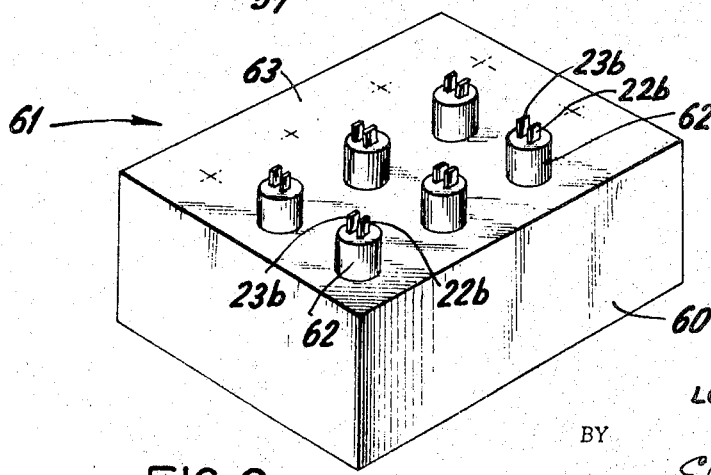
FIG. 8
INVENTOR.
LOEBE JULIE
BY
*Eliot S. Gerber*
ATTORNEY United States Patent Office 3,488,760
Patented Jan. 6, 1970

3,488,760
REED RELAY MODULE
Loebe Julie, New York, N.Y., assignor to Julie Research Laboratories, Inc., New York, N.Y., a corporation of New York
Filed Apr. 10, 1968, Ser. No. 720,117
Int. Cl. H01h 1/66, 50/10, 51/28
U.S. Cl. 335—154                                    24 Claims

ABSTRACT OF THE DISCLOSURE

A reed relay module consists of a number of reed relay containers each having a control coil. The coils are mounted on tubes which protrude through, and are attached to, two end plates. The reed relay containers are within a series of plastic and metal sleeves. The sleeves and the tubes act as thermal and electrostatic shields for the relay containers.

---

Figure 1:
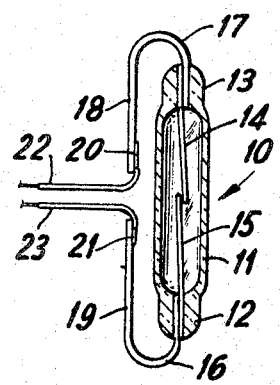

The present invention relates to relays and more particularly to a reed relay module.

A reed relay is an electrical relay which includes two flexible metal reeds in an evacuated container. The reeds are brought together by the passage of current through an electrical coil which surrounds the container. The reed relay has leads from each of its reeds leading through the walls of the container to the outside. A reed relay module consists of a group of reed relays which are physically mounted together in close proximity. Reed relays are widely used in certain types of switching since they are accurate and require relatively little current for the closing of their contacts. In addition, their contacts, when closed, present a low resistance.

One problem with reed relays which has limited their accuracy is that of thermal induced voltage. Thermal currents are primarily established in a reed relay due to heating of the relay coils. The heat from the coil may be transferred by radiation and convection to the reeds or other parts of the reed relay. Unequal heating of parts of the relay may induce a thermal voltage which may exceed 1 microvolt. This thermal induced voltage disturbs the reading when the reed relay is used, for example, for accurate measuring instruments. Accurate reed relay modules, which exhibit low thermal voltages and which are electrostatically shielded, would be useful in such applications as data logging equipment, multiplexing devices, high-speed automatic or computer programmed scanning of electrical circuits, and computer compatible data acquisition equipment.

It is the objective of the present invention to provide a reed relay module which is comparatively less subject to induced thermal voltages.

It is a further objective of the present invention to provide a reed relay in which the reeds are completely electrostatically isolated from the coils of the relay.

In accordance with the present invention, a reed relay module construction is provided in which the reed relay containers are electrostatically and thermally shielded from their coils. The shielding includes the heat insulating plastic bobbins on which the coils are wound. The bobbins are positioned over metal tubes which are adhered, for example, to metal end plates. The metal tubes and end plates provide complete electrostatic shielding and also dissipate the heat of the coils by acting as a symmetrical heat sink. A reed relay switch assembly is positioned in each tube. The assembly includes, as telescoped parts, an outer tubular plastic sleeve, an inner tubular assembly of two metal sleeves, an inner plastic sleeve and the reed relay container. The wires leading to the reeds of the reed relay container are symmetrically positioned and arranged to heat the reeds and leads evenly and avoid thermal induced voltages. The leads to the coils and the leads to the relay containers are arranged at opposite sides of the module to avoid electrical interference.

Figure 2:
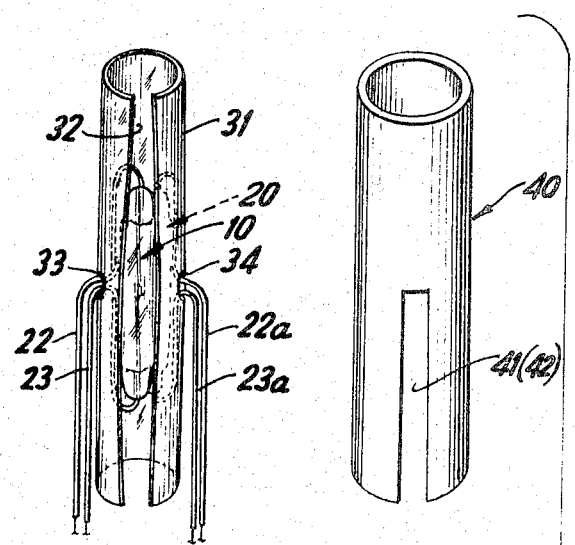
Figure 4:
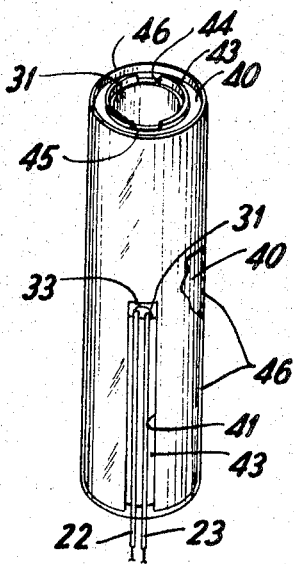
Figure 3:
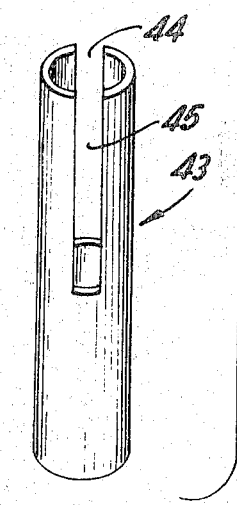

Other objectives will be apparent from the below detailed preferred embodiment of the invention taken together with the enclosed drawings, in which:

FIG. 1 is a side cross-sectional view of a reed relay switch used in the present invention;
FIG. 2 is a perspective view of two of the reed relay switches of FIG. 1 positioned within a plastic sleeve;
FIG. 3 is a perspective view of the top sleeve and bottom sleeve of the metal electrostatic shield and heat shield;
FIG. 4 is a perspective view showing the reed relay in its shield and covered with a plastic tube;
FIG. 5 is a perspective view of the reed relay module;
FIG. 6 is a cross-sectional view taken through one of the coils and tubes of the module;
FIG. 7 is a cross-sectional view taken along line 7—7 of FIG. 5; and
FIG. 8 is a perspective view of the reed relay module.

The sealed reed relay switch 10, shown in FIG. 1, utilizes a hermetically sealed container (envelope) 11, usually having an evacuated vacuum therein. The container is of glass or other insulative material. The container has two opposed ends 12 and 13 which are sealed around the ends of the metal flexible conductive reeds 14 and 15, respectively. The metal reeds are brought together to establish (complete) an electrical contact by means of a coil which is positioned around the container 11. The coil establishes a magnetic field when current is passed through the coil. The reeds (switch contacts) may respond to the magnetic field in different ways, for example, one reed may be of magnetic material and the other of non-magnetic material.

A wire 16 is joined within end 12 of the container 11 to the reed 15 and similarly a wire 17 is joined to the reed 14. The wires 16 and 17 are each bent to form opposite U-shaped legs having elongated leg portions 18 and 19, respectively. The leg portions 18 and 19 are soldered or welded at 20 and 21 to the insulated wires 22 and 23, respectively. The fastening of the insulated wires is positioned and arranged so that the insulated wires extend perpendicularly to the legs 18 and 19. Any heating that takes place in the wires 22 and 23 will be evenly spread into the legs 18 and 19 and have an equal heating effect on the reeds 14 and 15 as the wires are of equal length and both symmetrically directed toward the center of the reed switch. The reeds 14 and 15 only act as a generator of voltage if they are unevenly heated. Consequently, since care is taken so that they are evenly heated, they do not provide a voltage or thermal gradient.

A reed relay 10 is positioned within a tubular plastic sleeve 31 along with a second similar reed relay 20. The plastic sleeve 31, which may be, for example, of nylon or other insulating plastic material, is generally cylindrical and has an elongated opening 32 so that the reed relays 10 and 20 may be inserted. The sleeve 31 has opposite holes 33 and 34 through which the wires 22 and 23 and the similar wires 22a and 23a of reed relay 20 protrude. The insulating sleeve 31 provides electrical insulation to prevent the bare wires leading into the containers of the reed relays 10 and 20 from touching the surrounding metal shield. In addition, the plastic sleeve provides thermal insulation.

The plastic sleeve is covered by a two-piece metal tubular cartridge shell-like assembly, shown in FIG. 3. The top tubular member 40 consists of an elongated cylindrical metal tube which may be, for example, of brass. The first tubular member 40 has two elongated opposed slits 41 and 42 which extend to about the center along the axis of the tube 40. A second smaller tubular member 43 likewise has two slits 44 and 45. The second similar tubular member 43 is positioned to fit within the first tubular member 40, that is, the diameter of its outer wall is less than the diameter of the inner wall of the tube 40. The two tubular members 40 and 43 are formed so that tube 43 fits within tube 40.

In assembly, the plastic sleeve 31, containing the reed relay switches 10 and 20, is positioned within the smaller metal tubular member 43 with the wires 22, 23 and 22a, 23a directed downward, i.e., away from the direction of the slits 45 and 44. The larger metal tubular member 40 is then slipped over the smaller metal tubular member 43 with the wires 22, 23 and 22a, 23a within the slits 41 and 42. This assembly, which is shown in FIG. 4, is then placed within a shrinkable plastic sleeve 46. The plastic sleeve 46 is then shrunk, for example, by heating, to firmly enclose the members of the assembly. The metal tubular member 40 and 43 provide an electrostatic shield around the relay containers. In addition, they provide a heat (thermal) shield which spreads heat evenly over their surfaces and provides insulation, particularly against radiated heat. The plastic sleeve 46, in addition to keeping the various parts of the assembly together, also provides thermal shielding in that is provides some insulation.

The module sub-assembly is shown in FIG. 5. It consists of a top metal plate member 50 having a plurality of holes 51. Metal shield tubes 52 are soldered, welded or otherwise connected within the holes 51. A bottom plate member 53, having similar holes to holes 51, or which is solid, is similarly welded, soldered or otherwise fastened to the opposite ends of the metal tubes 52. Preferably the metal plates 50 and 53 are made relatively thick so that they provide good heat conduction and act as even radiators of heat produced by the coils. If a coil develops a hot spot, which is transmitted through its bobbin, the heat will be spread by the tube 52 and transmitted to the end plates, where it will be evenly radiated. Such spreading and radiation of the heat prevents its transmittal to the reed relay container.

Each of the shield tubes 52 is surrounded by a coil 55 having leads above the plate 53. The pulsing of a coil 55 with current will close the reeds which are within shield tube 52. The complete reed switch assembly, shown in FIG. 4, is inserted within each of the metal tubes 52 with the wires leads 22, 23 and 22a, 23a protruding upward, that is, from the side 50 of the plate.

The cross-sectional view of FIG. 7 shows the various insulating layers of the present invention. The coil 55 consists of a winding of insulated wires 56 which are wound around a plastic bobbin 57. The plastic bobbin provides insulation against the heat produced in the coil. The coil is positioned and firmly held, for example, by adhesive, on the metal electrostatic shield tube 52. The assembly within the shield tube 52 consists of an outer plastic layer 46, an outer metal tube 40, an inner metal tube 42, an inner plastic sleeve 31, and finally the reed relays 10 and 20.

The reed relay module shown in FIG. 5 is completely enclosed by side walls 60 to form a complete metal case 61. The leads 22 and 23 are attached to the bottom of connectors 22b and 23b, which connectors protrude through the round insulative plastic members 62. The members 62 are arranged on the top 63 of the case 61 and a similar set of connectors (not shown) for the reed relay coils are arranged on the bottom of the case 61. The case top 63 is parallel with the top metal plate 50 and is also of metal. The bottom metal plate 53 may itself constitute the bottom of the case 61.

I claim:

1. A reed relay moduule including first and second plates, the first plate having a plurality of openings, the said plates being of an electrostatic and thermal shielding material, a plurality of tubes of an electrostatic and thermal shielding material, said tubes separating said first and second plates and each tube being positioned between a hole in the first plate and the second plate, a reed relay coil positioned around each tube, and a reed relay container positioned within each tube.

2. A reed relay module as in claim 1 wherein said second plate has a plurality of openings and said tubes are positioned between the openings in said first and said second plates.

3. A reed relay module as in claim 1 wherein the said shielding materials are metal.

4. A reed relay module as in claim 1 wherein the leads to the relay coils are connected to a connector on the side of the second plate opposite the tubes.

5. A reed relay module as in claim 4 wherein the leads to the reed relay container protrude from the tubes above the face of the first plate opposite the tubes.

6. A reed relay module as in claim 1 and also including a metal container surrounding the sides of the plates to enclose the coils.

7. A reed relay module as in claim 1 and also including a tubular metal member around each reed relay container.

8. A reed relay module as in claim 7 wherein said tubular member comprises a first cylindrical tubular member having a slit in its side wall and a second cylindrical tubular member smaller in diameter than said first tubular member and having a slit in its side wall, the size of said members being adapted to permit telescoping of the said members and the length of the said slits adapted to form a hole to the interior of the assembly by the overlapping of the slits.

9. A reed relay module as in claim 7 and also including a plastic film tubular sleeve having an opening in its wall, said reed relay container being positioned in the said sleeve and the said sleeve being positioned within the said tubular metal member.

10. A reed relay module as in claim 7 and also including a plastic film sleeve fitted tightly around and surrounding the said tubular metal member.

11. A reed relay module as in claim 7 wherein said tubular metal member has an opening in its side wall for the leads of the reed relay container.

12. A reed relay module as in claim 1 wherein the reed relay container has opposite ends, each end having a lead to a reed, wherein the leads are symmetrically arranged from the container ends to a meeting point which is substantially in the plane of the center of the container.

13. A reed relay module as in claim 12 wherein the leads each have a U-shaped portion, each pair of leads associated with each container has its U-shaped portion in face-to-face relation, said leads being brought toward the plane of the center of said container by said U-shaped portions, and the said pair of leads protrude together from the said opening.

14. A reed relay module as in claim 13 wherein the leads consist of said U-shaped portions which are joined to wires substantially at the plane of the center of the reed relay container.

15. A reed relay module as in claim 13 wherein the said leads, after protruding from said opening, are in close thermal contact with said tubular member.

16. A reed relay unit including a reed relay container containing a set of reed contacts, a tubular shielding member positioned around said container, a tube surrounding said tubular member, and a reed relay coil positioned around said tube, the shielding member or the tube being of electrostatic shielding material and the other being of a thermal shielding and conducting material.

17. A reed relay unit as in claim 16 wherein said tubular member comprises a first cylindrical tubular member having a slit in its side wall and a second cylindrical tubular member smaller in diameter than said first tubular member and having a slit in its side wall, the size of said member being adapted to permit telescoping of the said members and the length of the said slits adapted to form a hole to the interior of the assembly by the overlapping of the silts.

18. A reed relay unit as in claim 16 and also including a plastic film tubular sleeve having an opening in its wall, said reed relay container being positioned in the said sleeve and the said sleeve being positioned within the said metal member.

19. A reed relay unit as in claim 18 and also including a plastic film sleeve fitted tightly around and surrounding the said tubular member.

20. A reed relay unit as in claim 16 wherein the said tubular member has an opening in its side wall for the leads of the reed relay container.

21. A reed relay unit as in claim 16 wherein the reed relay container has opposite ends, each end having a lead to a reed, wherein the leads are symmetrically arranged from the container ends to a meeting point which is substantially in the plane of the center of the container.

22. A reed relay unit as in claim 21 wherein the leads each have a U-shaped portion, each pair of leads has its U-shaped portion in a face-to-face relationship, said leads being brought toward the plane of the center of said container by said U-shaped portions and the said pair of leads protrude together from the said opening.

23. A reed relay unit as in claim 22 wherein the leads consist of said U-shaped portions which are joined to wires substantially at the plane of the center of the reed relay container.

24. A reed relay unit as in claim 22 wherein the said leads, after protruding from said opening, are in close thermal contact with said tubular member.

References Cited

UNITED STATES PATENTS

| | | | |
|---|---|---|---|
| 3,005,069 | 10/1961 | Sippach et al. | 335—152 |
| 3,320,559 | 5/1967 | Morrison | 335—151 |
| 3,308,408 | 3/1967 | Plice | 335—151 |
| 3,408,603 | 10/1968 | Morrison | 335—151 |

BERNARD A. GILHEANY, Primary Examiner

R. N. ENVALL, JR., Assistant Examiner